(12) United States Patent
Haerr et al.

(10) Patent No.: US 6,748,846 B2
(45) Date of Patent: Jun. 15, 2004

(54) SOLENOID VALVE, VACUUM BOOSTER DIAPHRAGM SUBASSEMBLY, AND VACUUM BOOSTER ASSEMBLY

(75) Inventors: Timothy A. Haerr, Enon, OH (US); Gary C. Fulks, Spring Valley, OH (US); Timothy M. Schlangen, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/115,652

(22) Filed: Apr. 4, 2002

(65) Prior Publication Data

US 2003/0154852 A1 Aug. 21, 2003

Related U.S. Application Data

(60) Provisional application No. 60/357,476, filed on Feb. 15, 2002.

(51) Int. Cl.[7] .................................................. F15B 13/16
(52) U.S. Cl. ...................... 91/367; 137/890; 137/596.17
(58) Field of Search .............................. 91/367, 376 R; 92/48, 49; 251/129.19; 137/870, 871, 596.17

(56) References Cited

U.S. PATENT DOCUMENTS

| | | | | |
|---|---|---|---|---|
| 479,795 | A | * | 8/1892 | Fortier ........................ 137/870 |
| 2,314,860 | A | * | 3/1943 | Lenin ..................... 137/596.17 |
| 2,426,779 | A | * | 9/1947 | MacDonald ................. 137/870 |
| 3,222,999 | A | | 12/1965 | Hager |
| 3,362,297 | A | * | 1/1968 | Cripe ............................. 92/48 |
| 3,362,298 | A | * | 1/1968 | Julow ........................ 91/376 R |
| 4,516,474 | A | * | 5/1985 | Ochiai ........................... 92/48 |
| 4,632,208 | A | * | 12/1986 | Takayama et al. ............. 303/3 |
| 4,966,248 | A | | 10/1990 | Farr |
| 5,152,587 | A | * | 10/1992 | Volz .......................... 91/369.3 |
| 5,176,433 | A | | 1/1993 | Byrnes et al. |
| 5,178,441 | A | | 1/1993 | Heibel et al. |
| 5,251,667 | A | | 10/1993 | Kunz et al. |
| 5,372,409 | A | | 12/1994 | Farr |
| 5,427,442 | A | | 6/1995 | Heibel |
| 6,027,099 | A | | 2/2000 | Pusateri |
| 6,272,969 | B1 | | 8/2001 | Zeuner et al. |
| 6,301,883 | B1 | | 10/2001 | Fulks et al. |
| 6,364,429 | B1 | | 4/2002 | Roden et al. |
| 6,623,088 | B2 | | 9/2003 | Roden et al. |

FOREIGN PATENT DOCUMENTS

| | | |
|---|---|---|
| GB | 1100379 | 1/1968 |
| GB | 1378702 | 12/1974 |
| WO | 00/68054 | 11/2000 |

* cited by examiner

Primary Examiner—F. Daniel Lopez
(74) Attorney, Agent, or Firm—Michael D. Smith

(57) ABSTRACT

A solenoid valve includes a valve housing having first, second, and third valve ports, an actuation rod, a first tip valve actuated by the first end of the actuation rod to allow or block fluid passage through the first valve port, and a second tip valve actuated by the second end of the actuation rod to allow or block passage through the second valve port. A vacuum booster diaphragm subassembly includes a vacuum booster diaphragm and a grommet attached to the vacuum booster diaphragm. A vacuum booster assembly includes the above-described solenoid valve, includes primary and secondary diaphragms, and includes the above-described grommet attached to the secondary diaphragm, wherein the secondary diaphragm is the above-described vacuum booster diaphragm.

12 Claims, 5 Drawing Sheets

US 6,748,846 B2

SOLENOID VALVE, VACUUM BOOSTER DIAPHRAGM SUBASSEMBLY, AND VACUUM BOOSTER ASSEMBLY

CROSS REFERENCE TO RELATED APPLICATIONS

The present application claims priority of U.S. Provisional Application No. 60/357,476 filed Feb. 15, 2002.

TECHNICAL FIELD

The present invention relates generally to valves and to vacuum boosters, and more particularly to a solenoid valve, to a vacuum booster diaphragm subassembly, and to a vacuum booster assembly.

BACKGROUND OF THE INVENTION

Conventional solenoid valves include those having a solenoid actuation rod having a valve end which engages a valve seat to block fluid passage and which disengages from the valve seat to allow fluid passage. One known application of a conventional solenoid valve is to allow or block passage of air to a chamber of a vacuum booster of a vehicle braking system. Conventional vacuum boosters include tandem vacuum boosters having primary and secondary vacuum and working chambers, a primary diaphragm dividing the primary working and vacuum chambers, and a secondary diaphragm dividing the secondary working and vacuum chambers.

What is needed is an improved solenoid valve useful for many applications including, but not limited to, a vacuum booster of a vehicle braking system. What also is needed is an improved secondary diaphragm for a vacuum booster. What additionally is needed is an improved vacuum booster assembly.

SUMMARY OF THE INVENTION

A first expression of a first embodiment of the invention is for a solenoid valve including a solenoid actuation rod, first and second tip valves, and a solenoid valve housing having first, second, and third valve ports. The first tip valve is actuated by the first end of the solenoid actuation rod to allow or block fluid passage through the first valve port, wherein fluid can flow between the first and third valve ports when the first tip valve is open. The second tip valve is actuated by the second end of the solenoid actuation rod to allow or block fluid passage through the second valve port, wherein fluid can flow between the second and third valve ports when the second tip valve is open.

A second expression of the first embodiment of the invention is for a vacuum booster diaphragm subassembly including a vacuum booster diaphragm and a grommet attached to the vacuum booster diaphragm. The vacuum booster diaphragm is installable in a vacuum booster assembly having primary and secondary working chambers such that the grommet allows fluid flow between the secondary working chamber and a region outside the vacuum booster assembly.

A third expression of the first embodiment of the invention is for a vacuum booster assembly including a vacuum booster and a solenoid valve. The vacuum booster has a primary working chamber with a primary outside port, a primary vacuum chamber, a primary diaphragm dividing the primary working and vacuum chambers, a secondary working chamber with a secondary outside port, a secondary vacuum chamber, a secondary diaphragm dividing the secondary working and vacuum chambers, and a grommet attached to the secondary diaphragm. The solenoid valve is identical to the solenoid valve previously described in the first expression, wherein the solenoid valve housing is attached to the vacuum booster with the first port in fluid communication with the primary port, with the second port in fluid communication with the atmosphere, and with the third port in fluid communication with the secondary port through the grommet.

Several benefits and advantages are derived from one or more of the expressions of the first embodiment of the invention. The tip valves of the solenoid valve provide large openings to allow for high fluid flow. The grommet of the vacuum booster diaphragm subassembly allows fluid flow between the secondary working chamber and a region outside the vacuum booster assembly. The vacuum booster assembly, when used in a vehicle braking system, provides the ability to quickly apply brake pressure.

DESCRIPTION OF THE PREFERRED EMBODIMENTS

Figure 1:
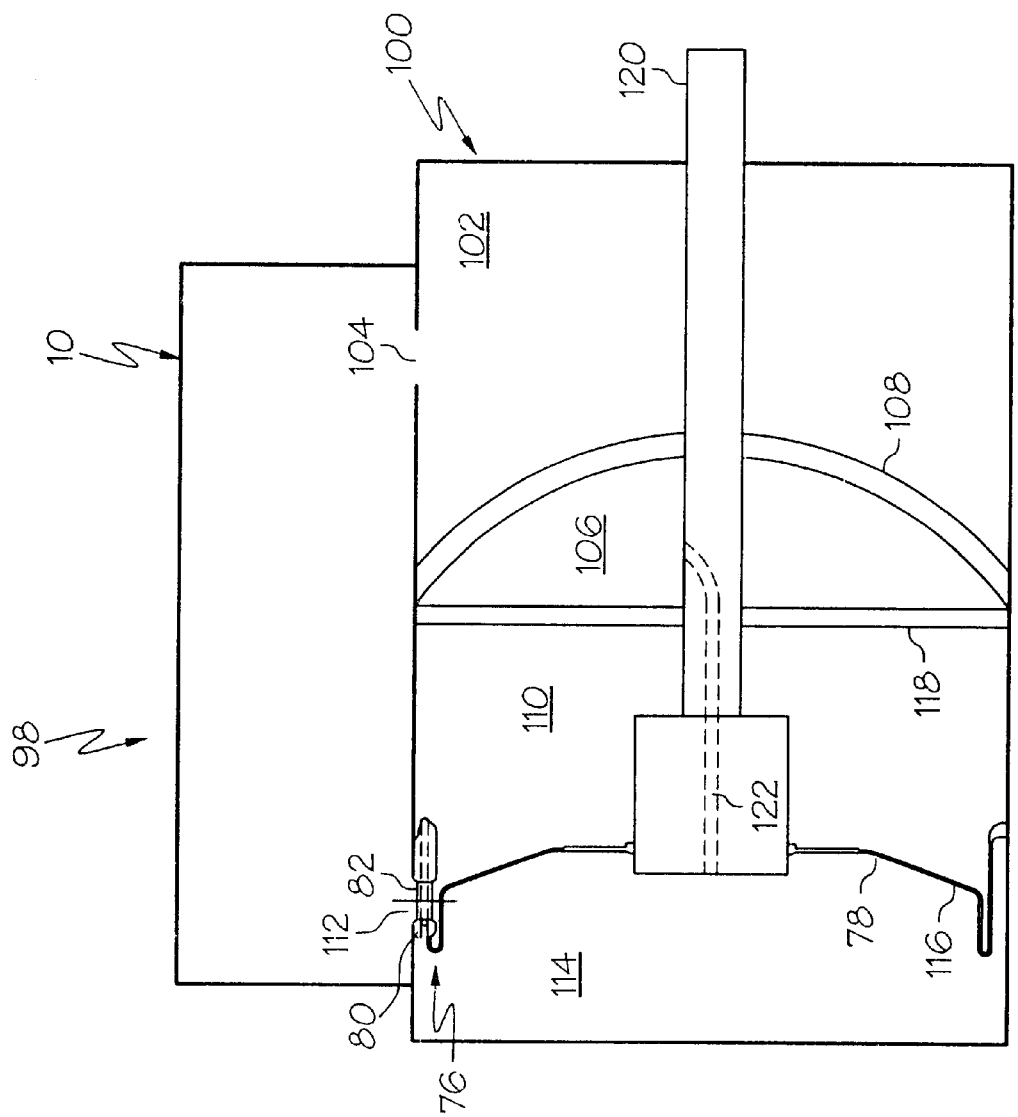
FIG. 1 is a schematic view, with the lower portion in cross section, of a first embodiment of the invention showing a vacuum booster assembly including a solenoid valve and including a vacuum booster having a primary diaphragm, a secondary diaphragm, and a grommet attached to the secondary diaphragm.

Referring now to the drawings, FIGS. 1–6 illustrate a first embodiment of the present invention. A first expression of the first embodiment, as seen in FIGS. 1, 2A, and 2B, is for a solenoid valve 10 including a solenoid valve housing 12, a solenoid actuation rod 14, and first and second tip valves 16 and 18. The solenoid valve housing 12 includes first, second, and third valve ports 20, 22, and 24. The solenoid actuation rod 14 has first and second ends 26 and 28. The first tip valve 16 is actuated by the first end 26 of the solenoid actuation rod 14 to allow or block fluid passage through the first valve port 20, wherein fluid can flow between the first and third valve ports 20 and 24 when the first tip valve 16 is open. The second tip valve 18 is actuated by the second end 28 of the solenoid actuation rod 14 to allow or block fluid passage through the second valve port 22, wherein fluid can flow between the second and third valve ports 22 and 24 when the second tip valve 18 is open.

Figure 2A:
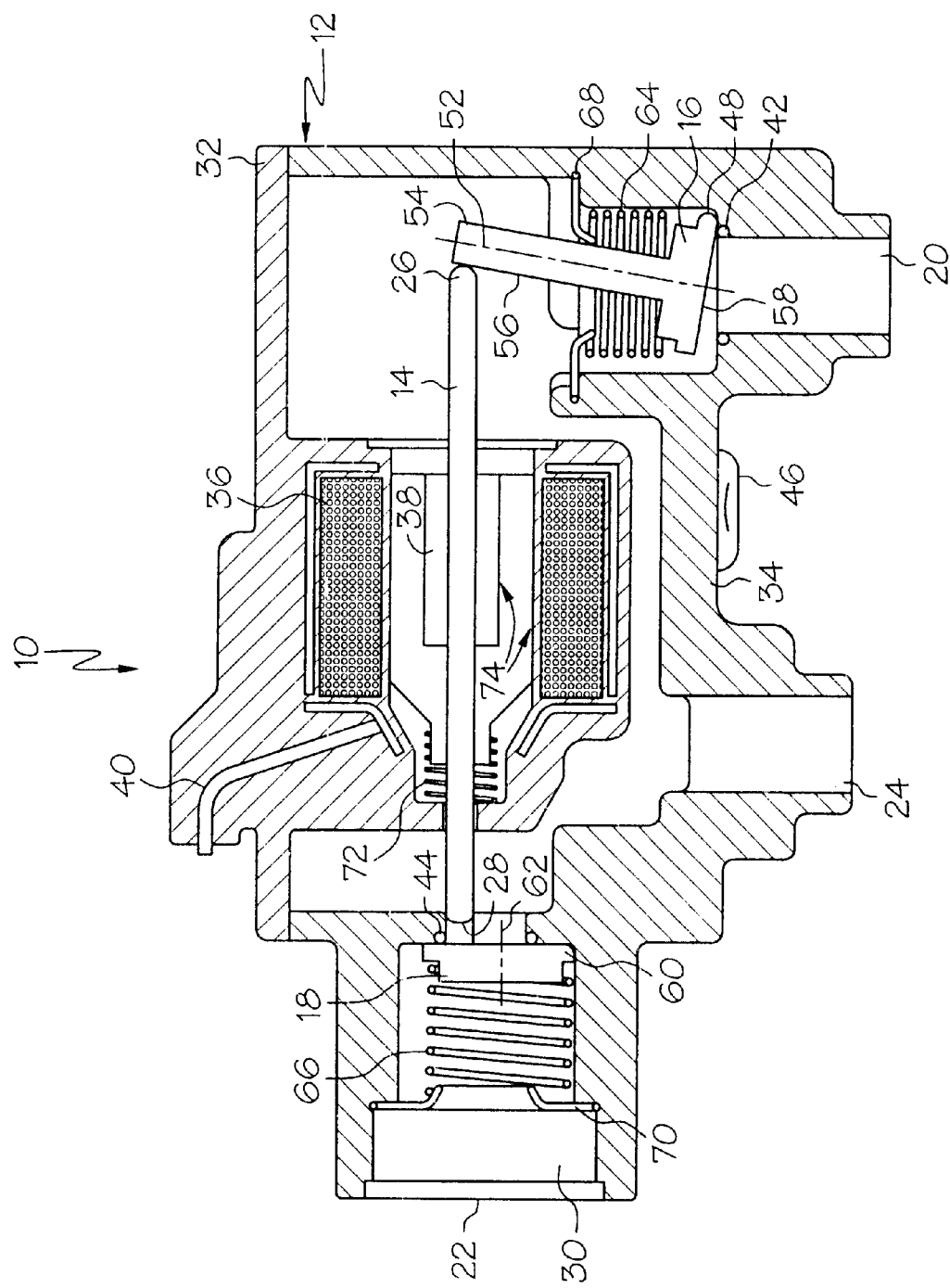
FIG. 2A is a cross-sectional view of the solenoid valve of the vacuum booster assembly of FIG. 1 showing the first tip valve opened and the second tip valve closed.
Figure 2B:
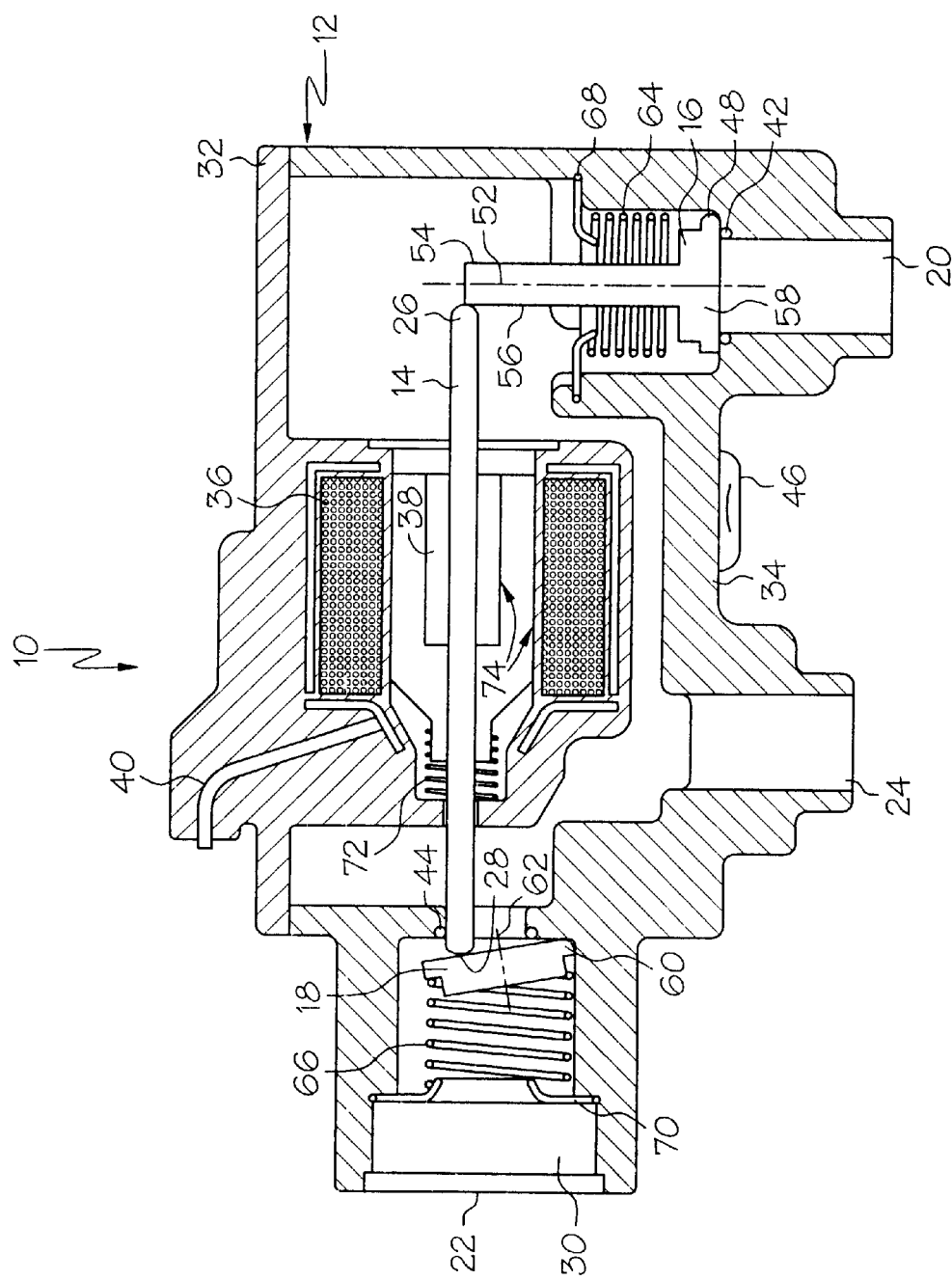
FIG. 2B is a view, as in FIG. 2A, but showing the first tip valve closed and the second tip valve opened.

It is noted that FIG. 2A shows the solenoid actuation rod 14 moved to the right with the first tip valve 16 open and the second tip valve 18 closed while FIG. 2B shows the solenoid actuation rod 14 moved to the left with the second tip valve 18 open and the first tip valve 16 closed.

In one example of the first expression of the first embodiment, the first, second, and third valve ports 20, 22, and 24 are pneumatic ports, the second valve port 22 is an atmospheric port, and the solenoid valve 10 also includes an air filter 30. The filter 30 is designed to keep debris out of the internal mechanism of the solenoid valve 10.

In the same or a different example, the solenoid valve housing 12 includes an integrated cover and coil assembly 32 and includes a main body 34. The cover and coil assembly 32 contains a solenoid coil 36, an armature 38, and a connector (i.e., an electrical lead) 40. It is noted that the air filter 30, when present, reduces in-rush noise when the solenoid coil 36 is energized. In one construction, the cover and coil assembly 32 consists essentially of plastic and is over-molded over the solenoid coil 36 and the connector 40. In this or another construction, the main body 34 consists essentially of plastic. The solenoid valve 10 includes elastomeric seals 42 and 44 for the first and second tip valves 16 and 18 as shown in FIG. 2. In one construction the elastomeric seals 42 and 44 are over-molded over the main body 34. The main body 34 is internally shaped to retain the first and second tip valves 16 and 18 and the air filter 30. The main body 34 includes the first, second, and third valve ports 20, 22, and 24.

In one application of the solenoid valve 10, the valve ports 20, 22, and 24 are pneumatic ports, and the first and third ports 20 and 24 connect to the primary and secondary working chambers of a vacuum booster. In this application, the main body 34 includes a mounting flange 46 to secure the solenoid valve 10 to the vacuum booster. In one construction, the cover and coil assembly 32 is sonically welded to the main body 34. In another construction, the cover and coil assembly 32 is fastened to the main body 34 with an intervening perimeter seal.

In the same or a different example, the first tip valve 16 has an elongated, rounded first edge 48, and the first end 26 of the solenoid actuation rod 14 pivots the first tip valve 16 about the first edge 48. The first edge 48 that the first tip valve 16 pivots on is straight when looking from a top view of FIG. 2. This provides a parallel surface for the first tip valve 16 to pivot. Such construction allows smooth and consistent operation of the first tip valve 16. In one construction, the first tip valve 16 has a first longitudinal axis 52 which is substantially perpendicular to the solenoid actuation rod 14 when the first tip valve 16 is closed. In one modification, the first tip valve 16 is substantially non-rotatable about the first longitudinal axis 52.

In one variation, the first tip valve 16 has a stem 54 coaxially aligned with the first longitudinal axis 52. This allows perpendicular actuation of the first tip valve 16 by the solenoid actuation rod 14. It is noted that the first edge 48 also keeps the stem 54 of the first tip valve 16 perpendicular to the solenoid actuation rod 14. In one construction, the stem 54 has a flat side 56 engageable by the first end 26 of the solenoid actuation rod 14, and surface 58 of the first tip valve 16 is square to prevent rotation of the first tip valve 16.

In the same or a different example, the second tip valve 18 has an elongated, rounded second edge 60, and the second end 28 of the solenoid actuation rod 14 pivots the second tip valve 18 about the second edge 60. The second edge 60 that the second tip valve 18 pivots on is straight when looking from an end view of FIG. 2. This provides a parallel surface for the second tip valve 18 to pivot. Such construction allows smooth and consistent operation of the second tip valve 18. In one application, the second tip valve 18 has a second longitudinal axis 62 which is substantially parallel to the solenoid actuation rod 14 when the second tip valve 18 is closed. In this application, the second tip valve 18 is axially actuated by the solenoid actuation rod 14.

In the same or a different example, each tip valve 16 and 18 has a respective spring 64 and 66 that closes the respective tip valve when force is removed from the solenoid actuation rod 14. The springs 64 and 66 provide the initial force to seal the respective tip valve on the respective elastomeric seals 42 and 44 over-molded on the main body 34. The tip valves 16 and 18 are designed so that the pressure differential provides additional force to seal the valves when they are closed. The spring retainers 68 and 70 preload the respective springs 64 and 66 and provide positive location for the springs.

In operation in one example of a vacuum booster, in the rest (de-energized) position, the primary working chamber valve (i.e., the first tip valve 16) is open and the atmospheric valve (i.e., the second tip valve 18) is closed. Air flows from the first valve port 20 (which engages the primary working chamber port of the vacuum booster) to the second port 22 (which engages the secondary working chamber port of the vacuum booster) through the solenoid valve 10. In operation in this vacuum booster example, when the solenoid valve 10 is energized, the first tip valve 16 is first closed to isolate vacuum from the valve. The second tip valve 18 is then opened to allow airflow into the secondary working chamber of the vacuum booster. When the solenoid valve 10 is de-energized, the armature return spring 72 forces the solenoid actuation rod 14 back into the rest position.

The solenoid valve 10 provides a low cost, high flow valve. It is designed for manufacturability. Advantages of one or more of the examples of the solenoid valve 10 include: long stroke actuation by providing linearized magnetics to the solenoid high flow rates from the tip valves and the long stroke, smooth and constant valve operation, positive sealing, small package size, a design for mounting on a vacuum booster of a vehicle brake system, permitting self-apply of a vacuum booster, having the vacuum booster apply to substantially half the runout force, enhancing cold weather performance for vehicle stability enhancement systems, having the air filter prevent vehicle under-hood debris from entering the solenoid valve and provide quiet operation, and providing a fail-safe mode to base brake operation. It is noted that a linearized-magnetics solenoid 74 can be constructed by those skilled in the art, includes the armature 38 attached to the solenoid actuation rod 14 and includes the solenoid coil 36 surrounding the armature 38.

It is noted that the solenoid valve 10 is not limited for use on a vacuum booster as can be appreciated by the artisan. It is also noted that, when used with a vacuum booster of a vehicle brake system, the solenoid valve 10 normally allows the primary working chamber of the vacuum booster to be connected to the secondary working chamber for base brake operation. When the solenoid is activated, the primary working chamber is isolated and the secondary working chamber is vented to atmosphere. This allows the booster to self-apply. For many advance brake technologies, it is desired to apply brake pressure quickly. The solenoid can be energized by its own controller or more cost effectively, using the anti-lock braking or vehicle stability enhancement controller.

A second expression of the first embodiment of the invention, as seen in FIGS. 1 and 3–6, is for a vacuum booster diaphragm subassembly 76 including a vacuum booster diaphragm 78 and a grommet 80 attached to the vacuum booster diaphragm 78, wherein the vacuum booster diaphragm 78 is disposable in a vacuum booster assembly having primary and secondary working chambers such that the grommet 80 allows fluid flow between the secondary working chamber and a region outside the vacuum booster assembly. In one construction, the vacuum booster diaphragm 78 and the grommet 80 consist essentially of rubber (e.g., urethane rubber) or other elastomeric material. In one variation, the grommet 80 is over-molded over, or integrally molded into, the vacuum booster diaphragm 78.

In one example of the second expression of the first embodiment, the grommet 80 includes a grommet opening 82 (seen in FIG. 4), an air-flow slot 84 (seen in FIG. 5), and a vacuum-booster-housing attachment groove 86 (seen in FIG. 6) provided for attachment of the grommet 80 to a matching cutout of the vacuum booster housing.

In this example, the vacuum booster diaphragm subassembly 76 is a modification of a conventional secondary vacuum booster diaphragm which adds a grommet 80 to allow a passageway (i.e., the grommet opening 82 and the air-flow slot 84) from the outside of the vacuum booster into the secondary working chamber of the vacuum booster. The grommet 80 provides either a face seal (at location 88) or a radial seal (at location 90) for a device such as a solenoid valve 10. The vacuum-booster-housing attachment groove 86 between the grommet and diaphragm seals and prevents the grommet from being pulled into the vacuum booster. In conventional booster designs, the front housing flange compresses the secondary diaphragm bead to seal air from leaking into the booster. With the design of the vacuum booster diaphragm subassembly 76, the front housing of the vacuum booster must be modified to accept the diaphragm with the grommet. It has been shown that the grommet design, using rubber, provides enough axial force to seal the bead in the grommet area. In one application, the grommet is reinforced with a rigid insert to help seal this area to overcome any compression set properties of rubber.

Figure 4:
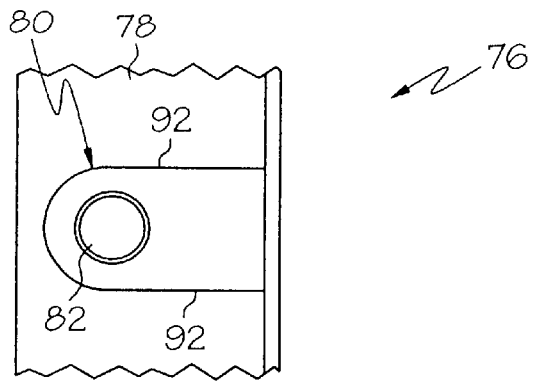
FIG. 4 is a view, along lines 4—4 of FIG. 3, of the vacuum booster diaphragm subassembly of FIG. 3 showing the grommet opening.

In this example, the section of the grommet that is internal to the diaphragm must not interfere with the operation of the diaphragm. The slotted feature (i.e., the air-flow slot 84) leading from the grommet opening 82 of the passageway to the secondary working chamber allows for airflow into the secondary working chamber of the vacuum booster. This feature also prevents the diaphragm from sealing against the passageway when the booster is evacuated. In one design, the grommet 80 has straight edges 92 as shown in FIG. 4. In another design, such edges of the grommet are angled which aid in assembly to the vacuum booster housing and which improve the seal around the perimeter of the grommet.

Figure 3:
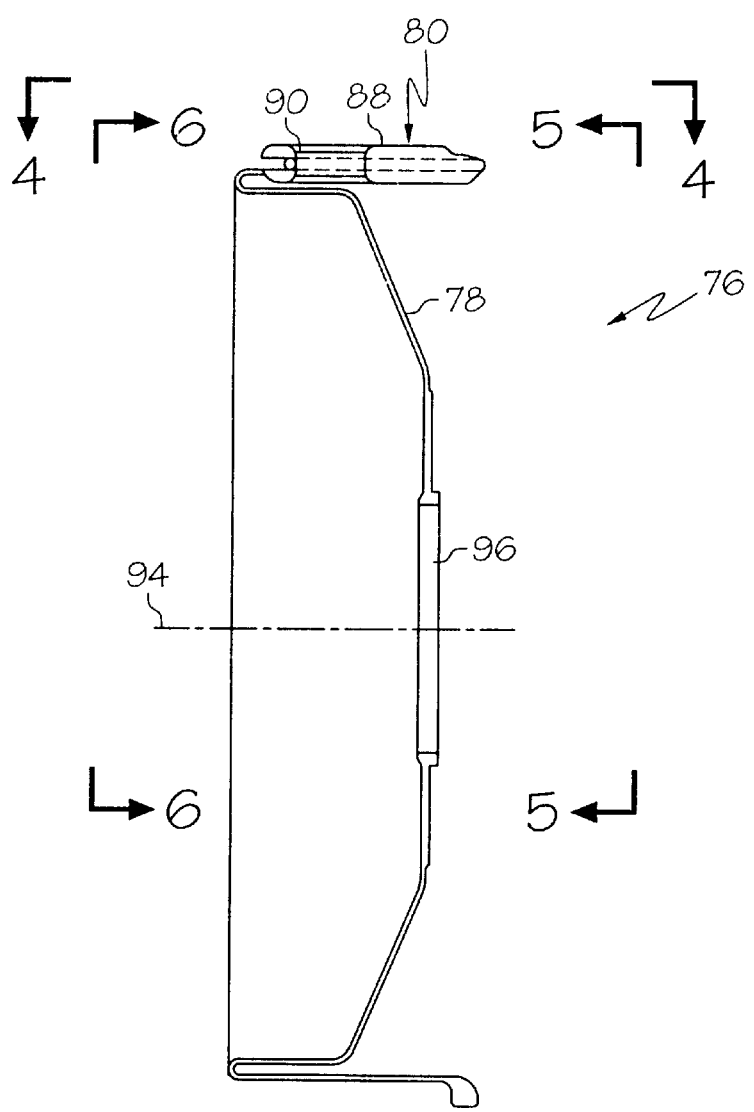
FIG. 3 is a cross-sectional view of a vacuum booster diaphragm subassembly which is the secondary diaphragm and the grommet of FIG. 1.
Figure 5:
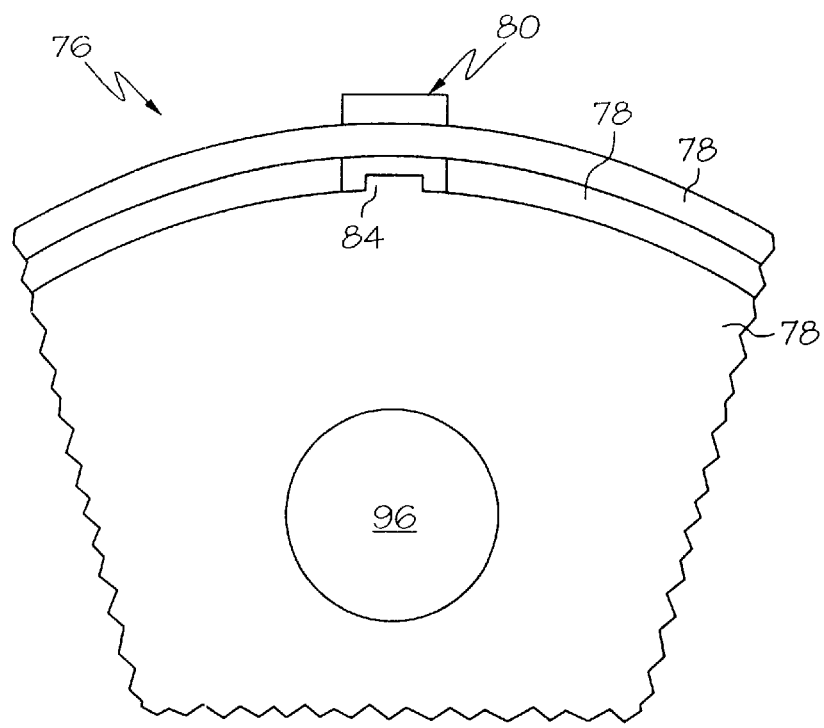
FIG. 5 is a view, along lines 5—5 of FIG. 3, of a portion of the vacuum booster diaphragm subassembly of FIG. 3 showing the air-flow slot of the grommet.
Figure 6:
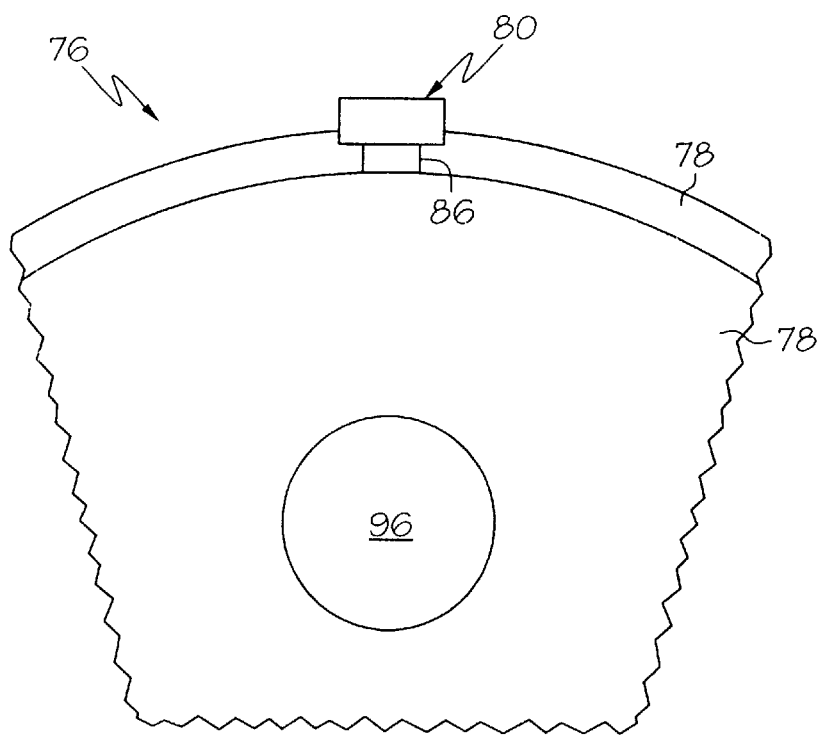
FIG. 6 is a view, along lines 6—6 of FIG. 3, of a portion of the vacuum booster diaphragm subassembly of FIG. 3 showing the vacuum-booster-housing attachment groove of the grommet for attachment of the grommet to a matching cutout of the vacuum booster housing.

In another example of the second expression of the first embodiment, the vacuum booster diaphragm 78 includes a diaphragm longitudinal axis 94 and a central opening 96 coaxially aligned with the diaphragm longitudinal axis 94, wherein the grommet 80 includes a grommet opening 82 aligned substantially perpendicular to the diaphragm longitudinal axis 94. In the same or a different example, the grommet 80 includes a radially-recessed (as seen in FIG. 3) air-flow slot 84 extending outward from the grommet opening 82 and substantially parallel to the diaphragm longitudinal axis 94. In the same or a different example, the grommet 80 includes a vacuum-booster-housing attachment groove 86.

Advantages of the vacuum booster diaphragm subassembly 76 include providing a low cost means of porting vacuum to the secondary working chamber of the vacuum booster while retaining the seal of the diaphragm bead and with minimal disruption of assembly of the vacuum booster.

In one application, the vacuum booster diaphragm subassembly 76 permits the solenoid valve 10 to attach to the perimeter of the vacuum booster and allows use of the solenoid valve 10 to self apply the booster.

It is noted that vacuum boosters contain diaphragms to separate the vacuum chambers from the working chambers. Most diaphragms perform a secondary purpose of sealing atmospheric pressure outside the booster from the vacuum inside the booster. It is sometimes desirable to access the secondary working chamber to monitor vacuum or control the pressure by using a solenoid valve. The vacuum booster diaphragm subassembly 76 provides a simple, effective means of providing a passageway to the secondary working chamber. It is also noted that a vacuum booster, such as but not limited to a tie rod design booster, can be used with the solenoid valve 10 without the use of the vacuum booster diaphragm subassembly 76 but with a conventional secondary diaphragm.

A third expression of the first embodiment of the invention is for a vacuum booster assembly 98 as seen overall in FIG. 1. The vacuum booster assembly 98 includes a vacuum booster 100 and a solenoid valve 10.

The vacuum booster 100 of the vacuum booster assembly 98 has a primary working chamber 102 with a primary outside port (also called a primary working chamber port) 104, a primary vacuum chamber 106, a primary diaphragm 108 dividing the primary working and vacuum chambers 102 and 106, a secondary working chamber 110 with a secondary outside port (also called a secondary working chamber port) 112, a secondary vacuum chamber 114, a secondary diaphragm 116 dividing the secondary working and vacuum chambers 110 and 114, and a grommet 80 attached to the secondary diaphragm 116. It is noted that the secondary diaphragm 116 is identical to the vacuum booster diaphragm 78 of the second expression of the first embodiment of the invention.

The solenoid valve 10 of the vacuum booster assembly 98 includes a solenoid valve housing 12, a solenoid actuation rod 14, and first and second tip valves 16 and 18. The solenoid valve housing 12 includes first, second, and third valve ports 20, 22, and 24. The solenoid actuation rod 14 has first and second ends 26 and 28. The first tip valve 16 is actuated by the first end 26 of the solenoid actuation rod 14 to allow or block fluid passage through the first valve port 20, wherein fluid can flow between the first and third valve ports 20 and 24 when the first tip valve 16 is open. The second tip valve 18 is actuated by the second end 28 of the solenoid actuation rod 14 to allow or block fluid passage through the second valve port 22, wherein fluid can flow between the second and third valve ports 22 and 24 when the second tip valve 18 is open. The solenoid valve housing 12 is attached to the vacuum booster 100 with the first valve port 20 in fluid communication with the primary outside port 104, with the second valve port 22 in fluid communication with the atmosphere, and with the third valve port 24 in fluid communication with the secondary outside port 112 through the grommet 80.

In one example, the vacuum booster 100 includes a divider plate 118 (such as a steel plate) dividing the primary vacuum chamber 106 and the secondary working chamber 110 and includes a power piston 120 having a passageway 122 connecting the primary and secondary vacuum chambers 106 and 114. When used in a vehicle braking system (such as, but not limited to, a vehicle stability enhancement system), the secondary vacuum chamber 114 includes a port (omitted from FIG. 1) leading to engine vacuum. In one example of the third expression, the solenoid valve 10 includes the previously-discussed optional features of the solenoid valve 10 discussed in the first expression of the first embodiment of the invention. In the same or a different example of the third expression, the secondary diaphragm 116 and/or the grommet 80 include the previously-discussed optional features of the vacuum booster diaphragm 78 and/or the grommet 80 discussed in the second to expression of the first embodiment of the invention.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A solenoid valve comprising:
   a) a solenoid valve housing including first, second, and third valve ports;
   b) a solenoid actuation rod having first and second ends;
   c) a first tip valve actuated by the first end of the solenoid actuation rod to allow or block fluid passage through the first valve port, wherein fluid can flow between the first and third valve ports when the first tip valve is open;
   d) a second tip valve actuated by the second end of the solenoid actuation rod to allow or block fluid passage through the second valve port, wherein fluid can flow between the second and third valve ports when the second tip valve is open; and
   e) a linearized-magnetics solenoid having an armature attached to the solenoid actuation rod and having a solenoid coil surrounding the armature.

2. The solenoid valve of claim 1, wherein the first, second, and third valve ports are pneumatic ports, wherein the second valve port is an atmospheric port, and wherein the solenoid valve also includes an air filter disposed in the second valve port.

3. The solenoid valve of claim 1, wherein the second tip valve has a second longitudinal axis which is substantially parallel to the solenoid actuation rod when the second tip valve is closed.

4. The solenoid valve of claim 1, wherein the first tip valve has an elongated, rounded first edge, and wherein the first end of the solenoid actuation rod pivots the first tip valve about the first edge.

5. The solenoid valve of claim 4, wherein the first tip valve has a first longitudinal axis which is substantially perpendicular to the solenoid actuation rod when the first tip valve is closed.

6. The solenoid valve of claim 5, wherein the first tip valve is substantially non-rotatable about the first longitudinal axis.

7. The solenoid valve of claim 6, wherein the first tip valve has a stem coaxially aligned with the first longitudinal axis, and wherein the stem has a flat side engageable by the first end of the solenoid actuation rod.

8. The solenoid valve of claim 1, wherein the second tip valve has an elongated, rounded second edge, and wherein the second end of the solenoid actuation rod pivots the second tip valve about the second edge.

9. A solenoid valve comprising:
   a) a solenoid valve housing including first, second, and third valve ports;
   b) a solenoid actuation rod having first and second ends;
   c) a first tip valve actuated by the first end of the solenoid actuation rod to allow or block fluid passage through the first valve port, wherein fluid can flow between the first and third valve ports when the first tip valve is open, wherein the first tip valve has an elongated, rounded first edge, and wherein the first end of the solenoid actuation rod pivots the first tip valve about the first edge;
   d) a second tip valve actuated by the second end of the solenoid actuation rod to allow or block fluid passage through the second valve port, wherein fluid can flow between the second and third valve ports when the second tip valve is open, wherein the second tip valve has an elongated, rounded second edge, and wherein the second end of the solenoid actuation rod pivots the second tip valve about the second edge; and
   e) a linearized-magnetics solenoid having an armature attached to the solenoid actuation rod and having a solenoid coil surrounding the armature.

10. A vacuum booster assembly comprising:
   a) a vacuum booster including:
      1) a primary working chamber with a primary outside port;
      2) a primary vacuum chamber;
      3) a primary diaphragm dividing the primary working and vacuum chambers;
      4) a secondary working chamber with a secondary outside port;
      5) a secondary vacuum chamber;
      6) a secondary diaphragm dividing the secondary working and vacuum chambers; and
      7) a grommet attached to the secondary diaphragm; and
   b) solenoid valve including:
      1) a solenoid valve housing including first, second, and third valve ports, wherein the solenoid valve housing is attached to the vacuum booster with the first valve port in fluid communication with the primary port, with the second valve port in fluid communication with the atmosphere, and with the third valve port in fluid communication with the secondary working chamber through the grommet;
      2) a solenoid actuation rod having first and second ends;
      3) a first tip valve actuated by the first end of the solenoid actuation rod to allow or block fluid passage through the first valve port, wherein fluid can flow between the first and third valve ports when the first tip valve is open; and
      4) a second tip valve actuated by the second end of the solenoid actuation rod to allow or block fluid passage through the second valve port, wherein fluid can flow between the second and third valve ports when the second tip valve is open,
      wherein the solenoid valve includes a linearized-magnetics solenoid having an armature attached to the solenoid actuation rod and having a solenoid coil surrounding the armature.

11. A vacuum booster assembly comprising:
   a) a vacuum booster including:
      1) a primary working chamber with a primary outside port;
      2) a primary vacuum chamber;

3) a primary diaphragm dividing the primary working and vacuum chambers;
4) a secondary working chamber with a secondary outside port;
5) a secondary vacuum chamber;
6) a secondary diaphragm dividing the secondary working and vacuum chambers; and
7) a grommet attached to the secondary diaphragm; and b) solenoid valve including:
1) a solenoid valve housing including first, second, and third valve ports, wherein the solenoid valve housing is attached to the vacuum booster with the first valve port in fluid communication with the primary port, with the second valve port in fluid communication with the atmosphere, and with the third valve port in fluid communication with the secondary working chamber through the grommet;
2) a solenoid actuation rod having first and second ends;
3) a first tip valve actuated by the first end of the solenoid actuation rod to allow or block fluid passage through the first valve port, wherein fluid can flow between the first and third valve ports when the first tip valve is open; and
4) a second tip valve actuated by the second end of the solenoid actuation rod to allow or block fluid passage through the second valve port, wherein fluid can flow between the second and third valve ports when the second tip valve is open, wherein the first tip valve has an elongated, rounded first edge, wherein the first end of the solenoid actuation rod pivots the first tip valve about the first edge, wherein the second tip valve has an elongated, rounded second edge, wherein the second end of the solenoid actuation rod pivots the second tip valve about the second edge.

12. A vacuum booster assembly comprising:

a) a vacuum booster including:
1) a primary working chamber with a primary outside port;
2) a primary vacuum chamber;
3) a primary diaphragm dividing the primary working and vacuum chambers;
4) a secondary working chamber with a secondary outside port;
5) a secondary vacuum chamber;
6) a secondary diaphragm dividing the secondary working and vacuum chambers; and
7) a grommet attached to the secondary diaphragm; and b) solenoid valve including:
1) a solenoid valve housing including first, second, and third valve ports, wherein the solenoid valve housing is attached to the vacuum booster with the first valve port in fluid communication with the primary port, with the second valve port in fluid communication with the atmosphere, and with the third valve port in fluid communication with the secondary working chamber through the grommet;
2) a solenoid actuation rod having first and second ends;
3) a first tip valve actuated by the first end of the solenoid actuation rod to allow or block fluid passage through the first valve port, wherein fluid can flow between the first and third valve ports when the first tip valve is open; and
4) a second tip valve actuated by the second end of the solenoid actuation rod to allow or block fluid passage through the second valve port, wherein fluid can flow between the second and third valve ports when the second tip valve is open, wherein the grommet includes a vacuum-booster-housing attachment groove.

\* \* \* \* \*